US010284494B2

(12) United States Patent
He et al.

(10) Patent No.: US 10,284,494 B2
(45) Date of Patent: May 7, 2019

(54) DEVICE CONTROLLING METHOD, CLIENT, SERVER AND INTERMEDIATE DEVICE

(71) Applicant: Baidu Online Network Technology (Beijing) Co., Ltd., Beijing (CN)

(72) Inventors: Lei He, Beijing (CN); Lei Niu, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 665 days.

(21) Appl. No.: 14/575,276

(22) Filed: Dec. 18, 2014

(65) Prior Publication Data
US 2015/0281123 A1 Oct. 1, 2015

(30) Foreign Application Priority Data

Mar. 28, 2014 (CN) .......................... 2014 1 0123115

(51) Int. Cl.
*H04L 12/911* (2013.01)
*H04L 29/08* (2006.01)
(Continued)

(52) U.S. Cl.
CPC .............. *H04L 47/82* (2013.01); *G05B 15/02* (2013.01); *H04L 12/2818* (2013.01); (Continued)

(58) Field of Classification Search
CPC . H04L 47/82; H04L 12/2818; H04L 12/2834; H04L 67/06; H04L 67/125; G05B 15/02
See application file for complete search history.

(56) References Cited

U.S. PATENT DOCUMENTS 8,650,283 B1 * 2/2014 Chang .............. H04N 21/25875
709/224
2003/0008650 A1 * 1/2003 Matsuyama ........ H04M 3/4938
709/201
(Continued)

FOREIGN PATENT DOCUMENTS

KR      100717940 B1    5/2007
KR     20080111037 A   12/2008
(Continued)

OTHER PUBLICATIONS

English translation of Office Action from the Patent Office of the People's Republic of China dated Jan. 28, 2016 fo Chinese Application No. 201410123115.X.
(Continued)

*Primary Examiner* — Shean Tokuta
*Assistant Examiner* — Juan C Turriate Gastulo
(74) *Attorney, Agent, or Firm* — David D. Brush; Westman, Champlin & Koehler, P.A.

(57) ABSTRACT

A device controlling method, a client, a server and an intermediate device are provided. The device controlling method includes acquiring information on an intermediate device and information on a controlled device associated with the intermediate device; sending a resource downloading command carrying the information on the intermediate device which is to obtain a resource to a server so as to enable the intermediate device to obtain the resource via the server; and sending an operation instruction to the controlled device associated with the intermediate device so as to enable the controlled device to obtain the resource from the intermediate device to perform an operation according to the operation instruction.

23 Claims, 13 Drawing Sheets

(51) Int. Cl.
*H04L 12/28* (2006.01)
*G05B 15/02* (2006.01)

(52) U.S. Cl.
CPC .......... *H04L 12/2834* (2013.01); *H04L 67/06* (2013.01); *H04L 67/125* (2013.01)

(56) References Cited

U.S. PATENT DOCUMENTS

| | | | |
|---|---|---|---|
| 2005/0129042 A1* | 6/2005 | Muhonen | H04H 20/40 370/412 |
| 2006/0080380 A1* | 4/2006 | Aizu | H04L 12/2803 709/203 |
| 2007/0288967 A1* | 12/2007 | Candelore | H04N 5/913 725/50 |
| 2008/0301262 A1 | 12/2008 | Kinoshita et al. | |
| 2009/0024754 A1* | 1/2009 | Setton | H04L 65/4084 709/231 |
| 2009/0222514 A1 | 9/2009 | Igarashi | |
| 2009/0271502 A1 | 10/2009 | Xue et al. | |
| 2010/0125652 A1* | 5/2010 | Rantapuska | H04L 12/2818 709/222 |
| 2015/0026746 A1* | 1/2015 | Fondberg | H04L 65/4084 725/112 |
| 2015/0095790 A1* | 4/2015 | Yoshida | G06F 3/0482 715/740 |
| 2015/0133049 A1* | 5/2015 | Lee | H04W 4/003 455/41.1 |
| 2015/0365878 A1* | 12/2015 | Cho | H04W 24/10 370/254 |

FOREIGN PATENT DOCUMENTS

| | | |
|---|---|---|
| WO | 0123994 A1 | 4/2001 |
| WO | 2013112081 A1 | 8/2013 |
| WO | 2013169043 A1 | 11/2013 |

OTHER PUBLICATIONS

English translation of Office Action from the Korean Patent Office dated Jan. 20, 2016 for Korean Application No. 10-2014-0183260.
European Search Report and Written Opinion dated Jul. 30, 2015 for European Application No. 14198136.
Office Action dated Oct. 1, 2018 from the European Patent Office for European Application No. 14198136.5-1213.

* cited by examiner

DEVICE CONTROLLING METHOD, CLIENT, SERVER AND INTERMEDIATE DEVICE

CROSS-REFERENCE TO RELATED APPLICATION

This application claims priority to and benefits of Chinese Patent Application Serial No. 201410123115.X, filed with the State Intellectual Property Office of P. R. China on Mar. 28, 2014, the entire content of which is incorporated herein by reference.

FIELD

The present disclosure relates to the field of an electronic device, and more particularly to a device controlling method, a client, a server and an intermediate device.

BACKGROUND

The Internet of Things is an important part of the next generation of information technology, which is an internet connecting things, in which things perform information exchange and communication via a network. Currently, a user may manage and operate a device (e.g., a smart television, a refrigerator, an air conditioner, etc.) via a local management page, a remote controller, a button, etc. For example, a network program the user is interested in may be selected via a remote controller to play the network program.

However, there are the following problems in the related art. When a smart device is managed and operated, the operation distance is limited. For example, when the smart device is managed via a local management page, the user and the smart device need to be located in the same local area network or even the same wireless local area network at a distance within 50 meters from each other.

SUMMARY

Embodiments of the present disclosure seek to solve at least one of the problems existing in the related art to at least some extent.

According to a first aspect of the present disclosure, a device controlling method is provided. The device controlling method comprises acquiring information on an intermediate device and information on a controlled device associated with the intermediate device; sending a resource downloading command carrying the information on the intermediate device which is to obtain a resource to a server so as to enable the intermediate device to obtain the resource via the server; and sending an operation instruction to the controlled device associated with the intermediate device so as to enable the controlled device to obtain the resource from the intermediate device to perform an operation according to the operation instruction.

With the device controlling method according to embodiments of the present disclosure, since the client acquires the information on the intermediate device and the information on the controlled device and sends the resource downloading command to the server so as to enable the intermediate device to obtain the resource in the server, the controlled device obtains the operation instruction via the server and the intermediate device and performs the related operation according to the operation instruction, such that the problem of distance limitations in controlling the controlled device may be solved. Thus, the user may simply log into the client to control the controlled device anywhere, anytime, thereby providing the user with convenience and enhancing the user experience of the user.

According to a second aspect of the present disclosure, a device controlling method is provided. The device controlling method comprises receiving from a client a resource downloading command carrying information on an intermediate device which is to obtain a source; and sending a download instruction to the intermediate device according to the resource downloading command so as to enable the intermediate device to obtain the resource according to the download instruction.

With the device controlling method according to embodiments of the present disclosure, by receiving the resource downloading command from the client and sending the download instruction to the intermediate device, the corresponding intermediate device obtains the corresponding resource according to the download instruction, such that the problem of distance limitations in controlling the controlled device may be solved. Thus, the user may simply log into the client to control the controlled device anywhere, anytime, thereby providing the user with convenience and enhancing the experience of the user.

According to a third aspect of the present disclosure, a device controlling method is provided. The device controlling method comprises receiving a download instruction from a server, and obtaining a resource according to the download instruction; and receiving an operation instruction from the server, and sending the operation instruction to a controlled device associated with the intermediate device so as to enable the controlled device to obtain the resource to perform an operation according to the operation instruction.

With the device controlling method according to embodiments of the present disclosure, since the intermediate device receives the download instruction from the server and sends the operation instruction to the controlled device associated with the intermediate device, the controlled device may obtain the corresponding resource to perform the related operation according to the operation instruction, such that the problem of distance limitations in controlling the controlled device may be solved. Thus, the user may simply log into the client to control the controlled device anywhere, anytime, thereby providing the user with convenience and enhancing the experience of the user.

According to a fourth aspect of the present disclosure, a client is provided. The client comprises an acquiring module configured to acquire information on an intermediate device and information on a controlled device associated with the intermediate device; a command sending module configured to send a resource downloading command carrying the information on the intermediate device which is to obtain a resource to a server so as to enable the intermediate device to obtain the resource via the server; and an instruction sending module configured to send an operation instruction to the controlled device associated with the intermediate device so as to enable the controlled device to obtain the resource from the intermediate device to perform an operation according to the operation instruction.

With the client according to embodiments of the present disclosure, since the client acquires the information on the intermediate device and the information on the controlled device and sends the resource downloading command to the server so as to enable the intermediate device to obtain the resource in the server, the controlled device obtains the operation instruction via the server and the intermediate device and performs the related operation according to the operation instruction, such that the problem of distance limitations in controlling the controlled device may be solved. Thus, the user may simply log into the client to control the controlled device anywhere, anytime, thereby providing the user with convenience and enhancing the experience of the user.

According to a fifth aspect of the present disclosure, a server is provided. The server comprises a receiving module configured to receive from a client a resource downloading command carrying information on an intermediate device which is to obtain a source; and a sending module configured to send a download instruction to the intermediate device according to the resource downloading command so as to enable the intermediate device to obtain the resource according to the download instruction.

With the server according to embodiments of the present disclosure, by receiving the resource downloading command from the client and sending the download instruction to the intermediate device, the corresponding intermediate device obtains the corresponding resource according to the download instruction, such that the problem of distance limitations in controlling the controlled device may be solved. Thus, the user may simply log into the client to control the controlled device anywhere, anytime, thereby providing the user with convenience and enhancing the experience of the user.

According to a sixth aspect of the present disclosure, an intermediate device is provided. The intermediate device comprises an obtaining module configured to receive a download instruction from a server, and to obtain a resource according to the download instruction; a receiving module configured to receive an operation instruction from the server; and a sending module configured to send the operation instruction to a controlled device associated with the intermediate device so as to enable the controlled device to obtain the resource to perform an operation according to the operation instruction.

With the intermediate device according to embodiments of the present disclosure, since the intermediate device receives the download instruction from the server and sends the operation instruction to the controlled device associated with the intermediate device, the controlled device may obtain the corresponding resource to perform the related operation according to the operation instruction, such that the problem of distance limitations in controlling the controlled device may be solved. Thus, the user may simply log into the client to control the controlled device anywhere, anytime, thereby providing the user with convenience and enhancing the experience of the user.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
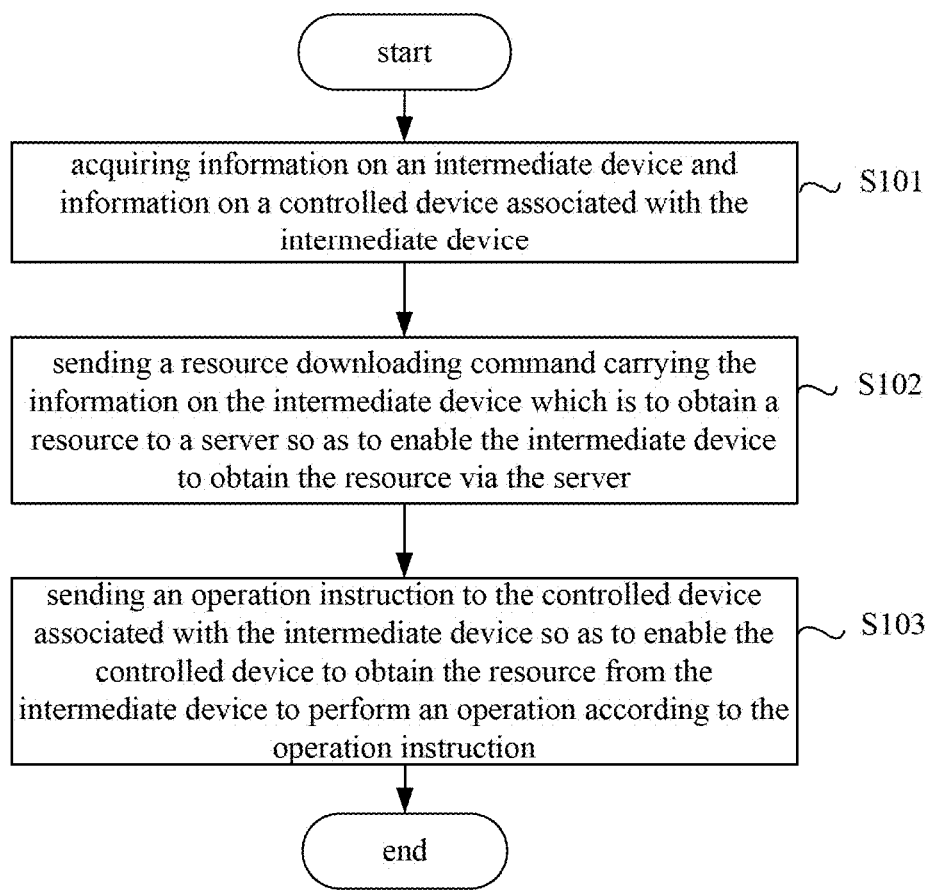
FIG. 1 is a flow chart of a device controlling method according to a first embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

A device controlling method, a client, a server, an intermediate device and a controlled device according to embodiments of the present disclosure will be described below with reference to the drawings.

In order to solve the problem of distance limitations in controlling the controlled device so as to enable the user to control the controlled device anywhere, anytime, a device controlling method according to an embodiment of the present disclosure is provided.

FIG. 1 is a flow chart of a device controlling method according to a first embodiment of the present disclosure.

This embodiment will be described at a client side. As shown in FIG. 1, the device controlling method according to the first embodiment of the present disclosure comprises the following steps.

In step S101, information on an intermediate device and information on a controlled device associated with the intermediate device are acquired.

In some embodiments, a user may log into a client by inputting a user account, and the user may log into the client in a mobile terminal, a desktop computer, a notebook computer, etc. After the user logs into the client successfully, the client may acquire the information on the intermediate device and the information on the controlled device associated with the intermediate device. The intermediate device is a device (e.g., a router) connecting a server with a controlled device. The controlled device may be a smart television, a smart speaker, etc.

In step S102, a resource downloading command carrying the information on the intermediate device which is to obtain a resource is sent to a server so as to enable the intermediate device to obtain the resource via the server.

In some embodiments, the server may actively push various resources (e.g., movies, music, pictures, etc.) to the intermediate device, or the intermediate device may obtain a corresponding resource in the server according to the resource downloading command. The client may send to the server the resource downloading command carrying the information (e.g., an identifier of the intermediate device) on the intermediate device which is to obtain the resource, such that the corresponding intermediate device may obtain the resource the user wants to download via the server.

In step S103, an operation instruction is sent to the controlled device associated with the intermediate device so as to enable the controlled device to obtain the resource from the intermediate device to perform an operation according to the operation instruction.

In some embodiments, the client may send the operation instruction to the controlled device associated with the intermediate device via the server and the intermediate device, such that the controlled device may obtain the corresponding resource from the intermediate device to perform the related operation according to the operation instruction. For example, the resource stored in the router may be a movie, the user may log into the client via a mobile phone to send an operation instruction for a smart television to the server, the operation instruction is sent to the router, and then the smart television receives the operation instruction from the router and plays the movie stored in the router according to the operation instruction. In addition, the playing speed of the movie may be controlled, and the volume of the movie may be adjusted.

For the client, only one application needs to be installed to manage all the controlled devices via a command notification channel, thus getting rid of the restriction of local wireless networks and saving the storage space of a mobile phone.

With the device controlling method according to embodiments of the present disclosure, since the client acquires the information on the intermediate device and the information on the controlled device and sends the resource downloading command to the server so as to enable the intermediate device to obtain the resource in the server, the controlled device obtains the operation instruction via the server and the intermediate device and performs the related operation according to the operation instruction, such that the problem of distance limitations in controlling the controlled device may be solved. Thus, the user may simply log into the client to control the controlled device anywhere, anytime, thereby providing the user with convenience and enhancing the user experience of the user.

Figure 2:
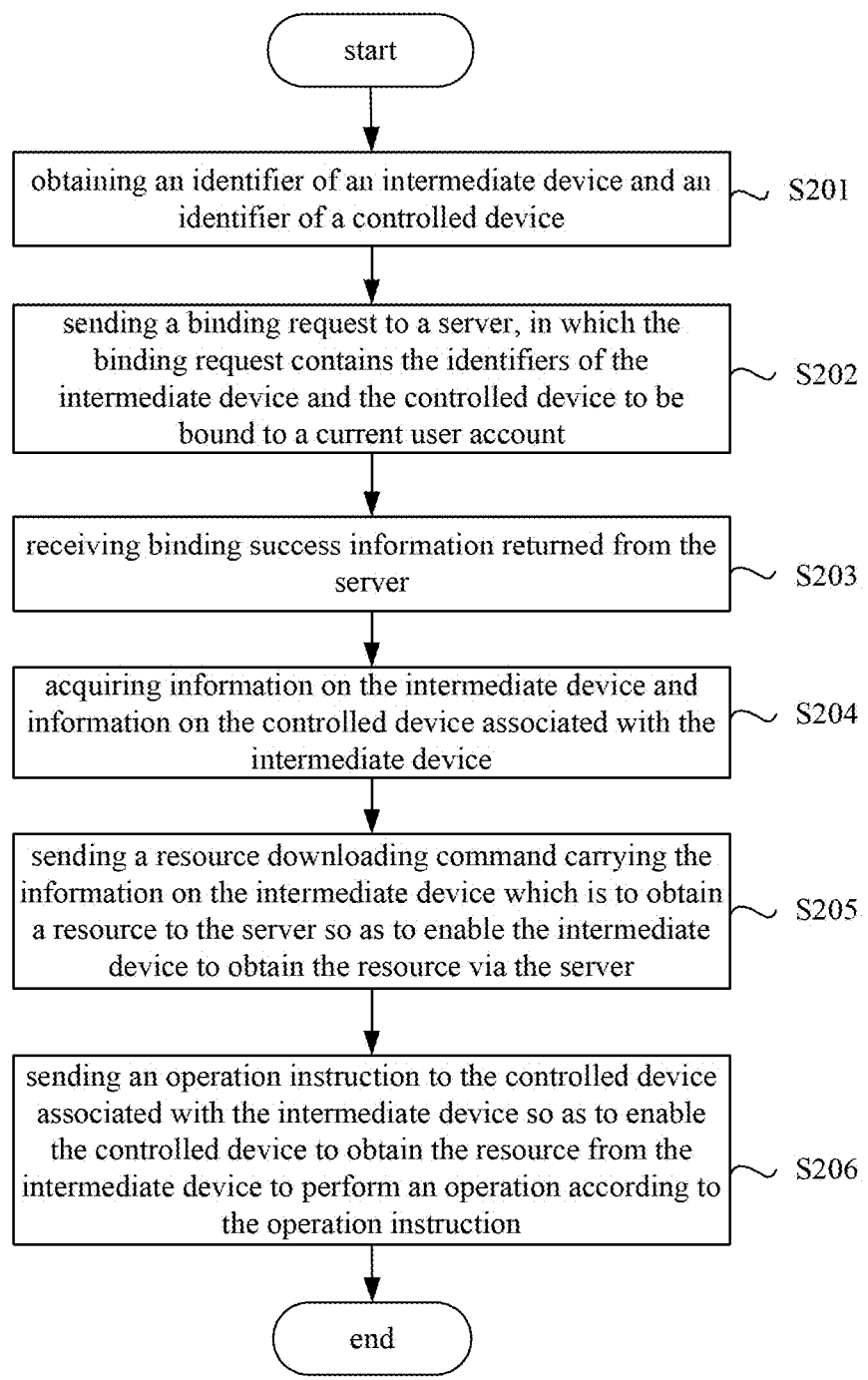
FIG. 2 is a flow chart of a device controlling method according to a second embodiment of the present disclosure.

FIG. 2 is a flow chart of a device controlling method according to a second embodiment of the present disclosure.

This embodiment will be described at a client side. As shown in FIG. 2, the device controlling method according to the second embodiment of the present disclosure comprises the following steps.

In step S201, an identifier of an intermediate device and an identifier of a controlled device are obtained.

In some embodiments, the client may obtain the identifier of the intermediate device and the identifier of the controlled device in various ways. Specifically, the client may obtain the identifier of the intermediate device and the identifier of the controlled device by a digital living network alliance (DLNA), or the client may obtain the identifier of the intermediate device and the identifier of the controlled device by inputting serial numbers of the intermediate device and the controlled device, or the client may obtain the identifier of the intermediate device and the identifier of the controlled device by scanning two-dimensional codes of the intermediate device and the controlled device respectively.

In step S202, a binding request is sent to a server, in which the binding request contains the identifiers of the intermediate device and the controlled device to be bound to a current user account.

In some embodiments, after obtaining the identifier of the intermediate device and the identifier of the controlled device, the client sends to the server the binding request containing the identifiers of the intermediate device and the controlled device to be bound to the current user account, such that the server binds the current user account to a device to be bound to the current user account. After the binding is successful, binding success information is returned to the client from the server.

In step S203, binding success information returned from the server is received.

In some embodiments, after the server binds the current user account to the device to be bound to the current user account, the client receives the binding success information returned from the server.

In step S204, information on the intermediate device and information on the controlled device associated with the intermediate device are acquired.

In some embodiments, after confirming that the binding of the current user account to the device to be bound to the current user account is successful, the client acquires the information on the intermediate device and the controlled device bound to the current user account. The information on the intermediate device may include the identifier of the intermediate device, and the information on the controlled device may include the identifier of the controlled device.

In step S205, a resource downloading command carrying the information on the intermediate device which is to obtain a resource is sent to the server so as to enable the intermediate device to obtain the resource via the server.

In some embodiments, the client may obtain various resources (e.g., movies, music, pictures, etc.) in the server. The client may send to the server the resource downloading command carrying the information on the intermediate device which is to obtain the resource, such that the intermediate device may obtain the resource the user wants to download via the server.

In step S206, an operation instruction is sent to the controlled device associated with the intermediate device so as to enable the controlled device to obtain the resource from the intermediate device to perform an operation according to the operation instruction.

In some embodiments, the client may send the operation instruction to the controlled device associated with the intermediate device via the server and the intermediate device, such that the controlled device may obtain the corresponding resource from the intermediate device to perform the related operation according to the operation instruction. For example, the resource stored in a router may be a movie, the user may log into the client via a mobile phone to send an operation instruction for a smart television to the server, the operation instruction is sent to the router, and then the smart television receives the operation instruction from the router and plays the movie stored in the router according to the operation instruction. In addition, the playing speed of the movie may be controlled, and the volume of the movie may be adjusted.

With the device controlling method according to embodiments of the present disclosure, by obtaining the identifier of the intermediate device and the identifier of the controlled device and sending the binding request to the server, the server may bind the controlled device and the intermediate device to the current user account, such that the same user account may control and manage a plurality of controlled devices in a unified manner and consequently the problem of distance limitations in controlling the controlled device may be solved. Thus, the user may simply log into the client to control the controlled device anywhere, anytime, thereby providing the user with convenience and enhancing the experience of the user.

Figure 3:
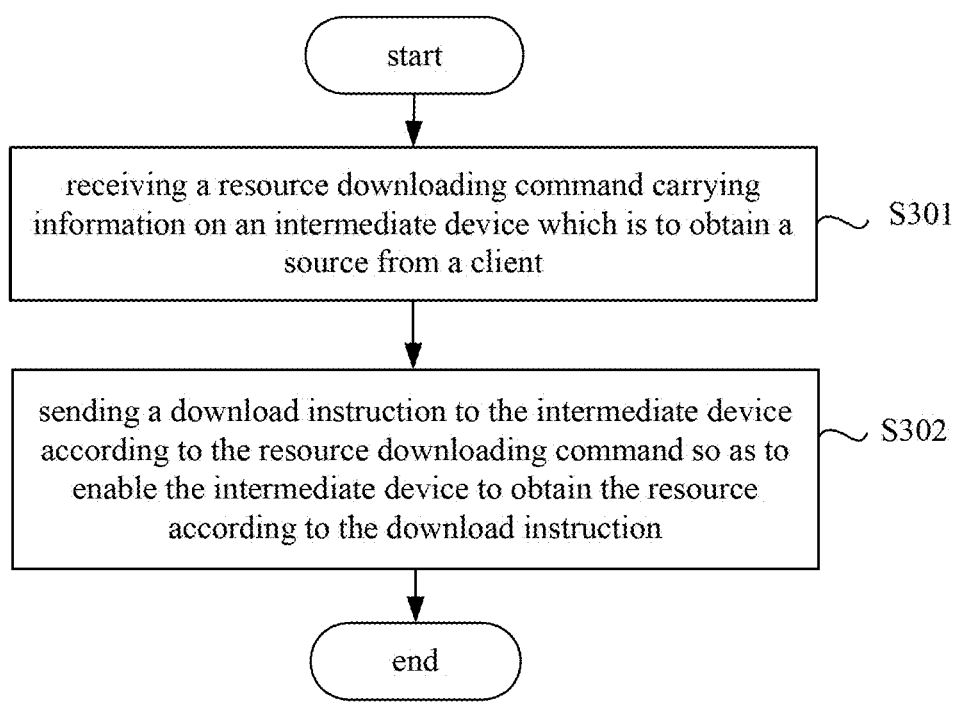
FIG. 3 is a flow chart of a device controlling method according to a third embodiment of the present disclosure.

FIG. 3 is a flow chart of a device controlling method according to a third embodiment of the present disclosure.

This embodiment will be described at a server side. As shown in FIG. 3, the device controlling method according to the third embodiment of the present disclosure comprises the following steps.

In step S301, a resource downloading command carrying information on an intermediate device which is to obtain a source is received from a client.

In some embodiments, a server may receive from the client the resource downloading command carrying the information on the intermediate device which is to obtain the source. The intermediate device may be a router. The information on the intermediate device may include an identifier of the intermediate device, etc.

In step S302, a download instruction is sent to the intermediate device according to the resource downloading command so as to enable the intermediate device to obtain the resource according to the download instruction.

In some embodiments, after receiving the resource downloading command from the client, the server may determine whether a storage space of the intermediate device meets a requirement according to the resource downloading command; if yes, the server generates a resource downloading address, and sends the download instruction containing the resource downloading address to the intermediate device, such that the corresponding intermediate device obtains the corresponding resource according to the download instruction.

With the device controlling method according to embodiments of the present disclosure, by receiving the resource downloading command from the client and sending the download instruction to the intermediate device, the corresponding intermediate device obtains the corresponding resource according to the download instruction, such that the problem of distance limitations in controlling the controlled device may be solved. Thus, the user may simply log into the client to control the controlled device anywhere, anytime, thereby providing the user with convenience and enhancing the experience of the user.

Figure 4:
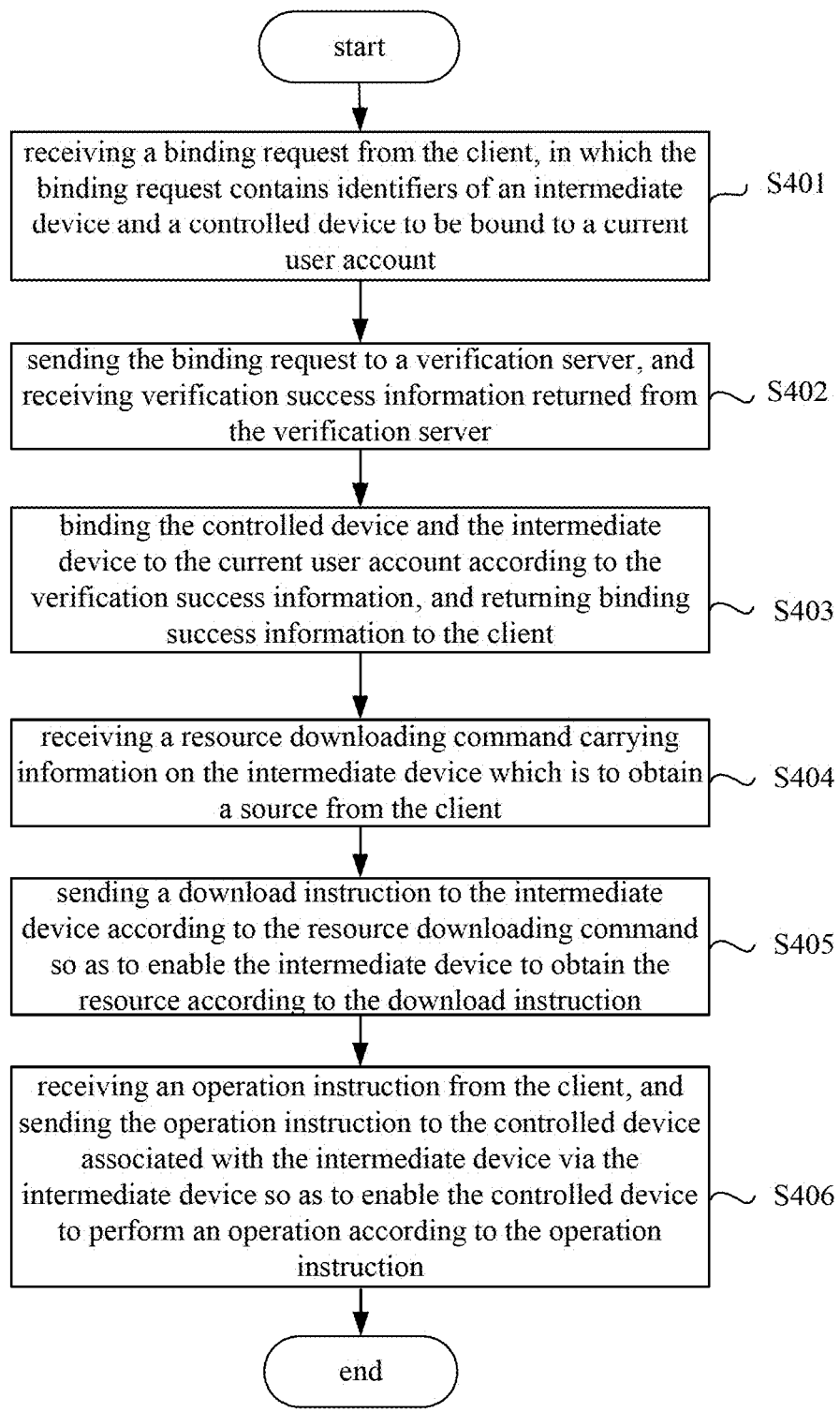
FIG. 4 is a flow chart of a device controlling method according to a fourth embodiment of the present disclosure.

FIG. 4 is a flow chart of a device controlling method according to a fourth embodiment of the present disclosure.

This embodiment will be described at a server side. As shown in FIG. 4, the device controlling method according to the fourth embodiment of the present disclosure comprises the following steps.

In step S401, a binding request is received from the client, in which the binding request contains identifiers of an intermediate device and a controlled device to be bound to a current user account.

In some embodiments, after the client obtains the identifier of the intermediate device and the identifier of the controlled device, the server receives from the client the binding request containing the identifiers of the intermediate device and the controlled device to be bound to the current user account.

In step S402, the binding request is sent to a verification server, and verification success information returned from the verification server is received.

In some embodiments, the server sends to the corresponding verification server the binding request containing the identifiers of the intermediate device and the controlled device to be bound to the current user account. For example, the server sends a binding request for a smart television to a verification server corresponding to the smart television, or the server sends a binding request for a router to a verification server corresponding to the router. Then, the server receives the verification success information returned from the verification server.

In step S403, the controlled device and the intermediate device are bound to the current user account according to the verification success information, and binding success information is returned to the client.

In some embodiments, after receiving the verification success information returned from the verification server, the server may call an application program interface (API) according to the verification success information to bind the controlled device and the intermediate device to the current user account. After the binding is successful, the binding success information is returned to the client from the server.

In step 404, a resource downloading command carrying information on the intermediate device which is to obtain a source is received from the client.

In some embodiments, after the binding is successful, the server may receive from the client the resource downloading command carrying the information on the intermediate device which is to obtain the source. The intermediate device may be a router. The information on the intermediate device may include a storage space and an identifier of the intermediate device.

In step S405, a download instruction is sent to the intermediate device according to the resource downloading command so as to enable the intermediate device to obtain the resource according to the download instruction.

In some embodiments, after receiving the resource downloading command from the client, the server may determine whether a storage space of the intermediate device meets a requirement according to the resource downloading command; if yes, the server generates a resource downloading address, and sends the download instruction containing the resource downloading address to the intermediate device, such that the corresponding intermediate device obtains the corresponding resource according to the download instruction.

Specifically, the server receives resource storage state information reported by the intermediate device, and determines whether the storage space of the intermediate device is greater than or equal to a size of the resource to be downloaded according to the resource downloading command and the resource storage state information. If the storage space of the intermediate device is greater than or equal to the size of the resource to be downloaded, the server generates a resource downloading address, and sends the download instruction containing the resource downloading address to the corresponding intermediate device, such that the corresponding intermediate device obtains the corresponding resource according to the download instruction. After the intermediate device obtains the corresponding resource, the server calls the application program interface (API) to inform the client of downloading completion. If the storage space of the intermediate device is smaller than the size of the resource to be downloaded, resources actively pushed by the server to the intermediate device are preferentially removed. If the storage space of the intermediate device is still smaller than the size of the resource to be downloaded, a prompt for insufficient storage space is sent to the client so as to enable the client to remove the resource selected by the user according to the operation of the user, such that the storage space of the intermediate device is greater than or equal to the size of the resource to be downloaded.

In step S406, an operation instruction is received from the client, and the operation instruction is sent to the controlled device associated with the intermediate device via the intermediate device so as to enable the controlled device to perform an operation according to the operation instruction.

In some embodiments, after the intermediate device obtains the corresponding source, the server may receive the operation instruction from the client, and sends the operation instruction to the controlled device associated with the intermediate device via the corresponding intermediate device so as to enable the controlled device to perform the related operation according to the operation instruction. For example, the resource stored in a router may be a movie, the user may log into the client via a mobile phone to send an operation instruction for a smart television to the server, the operation instruction is sent to the router, and then the smart television receives the operation instruction from the router and plays the movie stored in the router according to the operation instruction. In addition, the playing speed of the movie may be controlled, and the volume of the movie may be adjusted.

With the device controlling method according to embodiments of the present disclosure, by binding the controlled device and the intermediate device to the current user account, the same user account may control and manage a plurality of controlled devices in a unified manner, and consequently the problem of distance limitations in controlling the controlled device may be solved. Thus, the user may simply log into the client to control the controlled device anywhere, anytime, thereby providing the user with convenience and enhancing the experience of the user.

Figure 5:
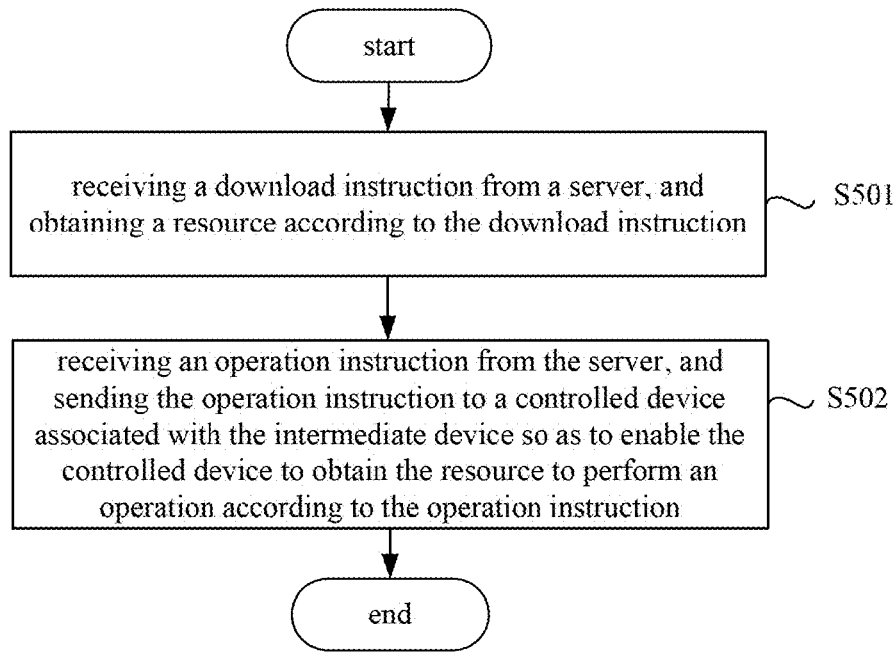
FIG. 5 is a flow chart of a device controlling method according to a fifth embodiment of the present disclosure.

FIG. 5 is a flow chart of a device controlling method according to a fifth embodiment of the present disclosure.

This embodiment will be described at an intermediate device side. As shown in FIG. 5, the device controlling method according to the fifth embodiment of the present disclosure comprises the following steps.

In step S501, a download instruction is received from a server, and a resource is obtained according to the download instruction.

In some embodiments, the intermediate device may receive the download instruction from the server, and obtains a resource downloading address according to the download instruction, and then downloads the resource according to the resource downloading address. The intermediate device may be a router.

Specifically, the intermediate device may download the resource via a peer-to-peer network (P2P), and if the downloading of the resource via the peer-to-peer network fails, the intermediate device is connected with a source station to download the resource.

In addition, when downloading the resource according to the resource downloading address, the intermediate device may report download progress and resource storage state information to the server regularly.

In step S502, an operation instruction is received from the server, and the operation instruction is sent to a controlled device associated with the intermediate device so as to enable the controlled device to obtain the resource to perform an operation according to the operation instruction.

In some embodiments, the intermediate device may receive the operation instruction from the client, and sends the operation instruction to the controlled device associated with the intermediate device so as to enable the controlled device to obtain the corresponding resource to perform the related operation according to the operation instruction. For example, the resource stored in a router may be a movie, the user may log into the client via a mobile phone to send an operation instruction for a smart television to the server, the operation instruction is sent to the router, and then the smart television receives the operation instruction from the router and plays the movie stored in the router according to the operation instruction. In addition, the playing speed of the movie may be controlled, and the volume of the movie may be adjusted.

With the device controlling method according to embodiments of the present disclosure, since the intermediate device receives the download instruction from the server and sends the operation instruction to the controlled device associated with the intermediate device, the controlled device may obtain the corresponding resource to perform the related operation according to the operation instruction, such that the problem of distance limitations in controlling the controlled device may be solved. Thus, the user may simply log into the client to control the controlled device anywhere, anytime, thereby providing the user with convenience and enhancing the experience of the user.

Figure 6:
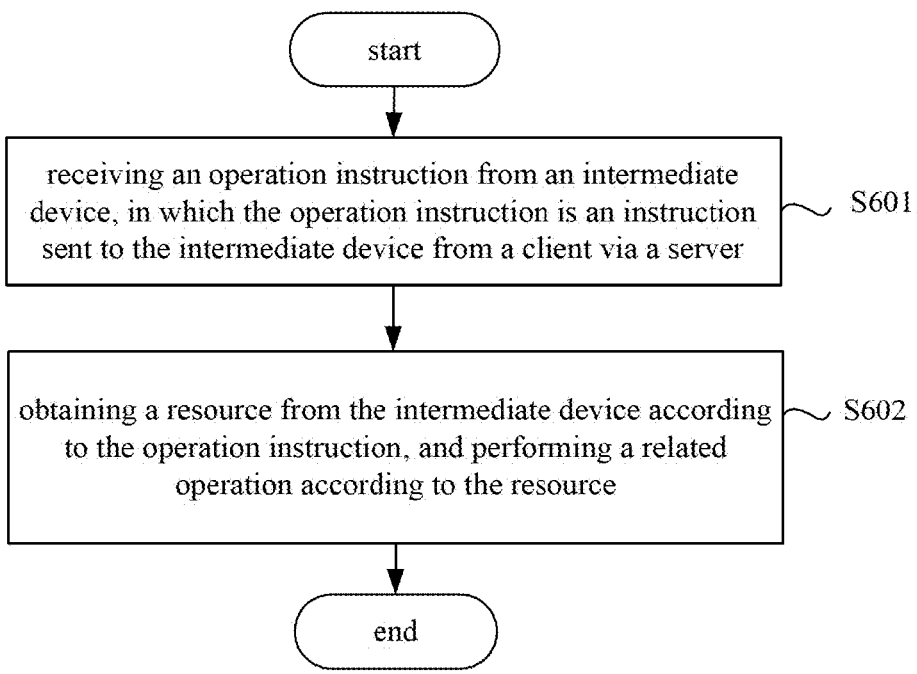
FIG. 6 is a flow chart of a device controlling method according to a sixth embodiment of the present disclosure.

FIG. 6 is a flow chart of a device controlling method according to a sixth embodiment of the present disclosure.

This embodiment will be described at a controlled device side. As shown in FIG. 6, the device controlling method according to the sixth embodiment of the present disclosure comprises the following steps.

In step S601, an operation instruction is received from an intermediate device, in which the operation instruction is an instruction sent to the intermediate device from a client via a server.

In some embodiments, a controlled device receives from the intermediate device the operation instruction sent to the intermediate device from the client via the server. The intermediate device may be a router, etc. the controlled device may be a smart television, etc.

In step S602, a resource is obtained from the intermediate device according to the operation instruction, and a related operation is performed according to the resource.

In some embodiments, the controlled device may obtain the resource from the intermediate device according to the operation instruction, and perform the related operation according to the resource. For example, the resource stored in a router may be a movie, the user may log into the client via a mobile phone to send an operation instruction for a smart television to the server, the operation instruction is sent to the router, and then the smart television receives the operation instruction from the router and plays the movie stored in the router according to the operation instruction. In addition, the playing speed of the movie may be controlled, and the volume of the movie may be adjusted.

With the device controlling method according to embodiments of the present disclosure, the intermediate device receives the operation instruction sent to the intermediate device from the client via the server and performs the related operation, such that the problem of distance limitations in controlling the controlled device may be solved. Thus, the user may simply log into the client to control the controlled device anywhere, anytime, thereby providing the user with convenience and enhancing the experience of the user.

In order to realize the above embodiments, a client is also provided.

Figure 7:
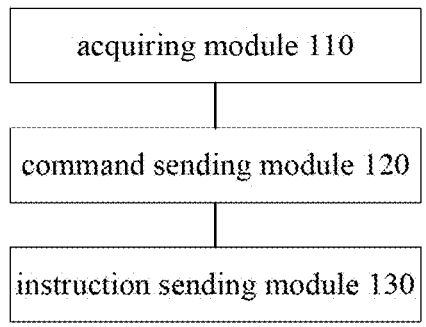
FIG. 7 is a block diagram of a client according to an embodiment of the present disclosure.

FIG. 7 is a block diagram of a client according to an embodiment of the present disclosure.

As shown in FIG. 7, the client according to an embodiment of the present disclosure comprises an acquiring module 110, a command sending module 120 and an instruction sending module 130.

The acquiring module 110 is configured to acquire information on an intermediate device and information on a controlled device associated with the intermediate device.

In some embodiments, a user may log into a client by inputting a user account, and the user may log into the client in a mobile terminal, a desktop computer, a notebook computer, etc. After the user logs into the client successfully, the acquiring module 110 may acquire the information on the intermediate device and the information on the controlled device associated with the intermediate device. The intermediate device is a device (e.g., a router) connecting a server with a controlled device. The controlled device may be a smart television, a smart speaker, etc.

The command sending module 120 is configured to send a resource downloading command carrying the information on the intermediate device which is to obtain a resource to a server so as to enable the intermediate device to obtain the resource via the server.

In some embodiments, the server may actively push various resources (e.g., movies, music, pictures, etc.) to the intermediate device, or the intermediate device may obtain a corresponding resource in the server according to the resource downloading command. The command sending module 120 may send to the server the resource downloading command carrying the information on the intermediate device which is to obtain the resource, such that the corresponding intermediate device may obtain the resource the user wants to download via the server.

The instruction sending module 130 is configured to send an operation instruction to the controlled device associated with the intermediate device so as to enable the controlled device to obtain the resource from the intermediate device to perform an operation according to the operation instruction.

In some embodiments, the instruction sending module 130 may send the operation instruction to the controlled device associated with the intermediate device via the server and the intermediate device, such that the controlled device may obtain the corresponding resource from the intermediate device to perform the related operation according to the operation instruction. For example, the resource stored in the router may be a movie, the user may log into the client via a mobile phone to send an operation instruction for a smart television to the server, the operation instruction is sent to the router, and then the smart television receives the operation instruction from the router and plays the movie stored in the router according to the operation instruction. In addition, the playing speed of the movie may be controlled, and the volume of the movie may be adjusted.

With the client according to embodiments of the present disclosure, since the client acquires the information on the intermediate device and the information on the controlled device and sends the resource downloading command to the server so as to enable the intermediate device to obtain the resource in the server, the controlled device obtains the operation instruction via the server and the intermediate device and performs the related operation according to the operation instruction, such that the problem of distance limitations in controlling the controlled device may be solved. Thus, the user may simply log into the client to control the controlled device anywhere, anytime, thereby providing the user with convenience and enhancing the experience of the user.

Figure 8:
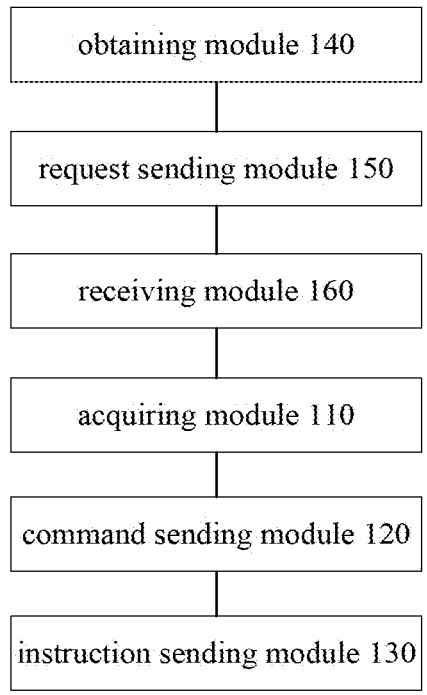
FIG. 8 is a block diagram of a client according to a particular embodiment of the present disclosure.

FIG. 8 is a block diagram of a client according to a particular embodiment of the present disclosure.

As shown in FIG. 8, the client according to a particular embodiment of the present disclosure comprises an acquiring module 110, a command sending module 120, an instruction sending module 130, an obtaining module 140, a request sending module 150 and a receiving module 160.

The obtaining module 140 is configured to obtain an identifier of an intermediate device and an identifier of a controlled device.

In some embodiments, the obtaining module 140 may obtain the identifier of the intermediate device and the identifier of the controlled device in various ways. Specifically, the obtaining module 140 may obtain the identifier of the intermediate device and the identifier of the controlled device by a digital living network alliance (DLNA), or the obtaining module 140 may obtain the identifier of the intermediate device and the identifier of the controlled device by inputting serial numbers of the intermediate device and the controlled device, or the obtaining module 140 may obtain the identifier of the intermediate device and the identifier of the controlled device by scanning two-dimensional codes of the intermediate device and the controlled device respectively.

The request sending module 150 is configured to send a binding request to a server, in which the binding request contains the identifiers of the intermediate device and the controlled device to be bound to the current user account.

In some embodiments, after obtaining the identifier of the intermediate device and the identifier of the controlled device, the request sending module 150 sends to the server the binding request containing the identifiers of the intermediate device and the controlled device to be bound to the current user account, such that the server binds the current user account to a device to be bound to the current user account. After the binding is successful, binding success information is returned to the client from the server.

The receiving module 160 is configured to receive binding success information returned from the server.

In some embodiments, after the server binds the current user account to the device to be bound to the current user account, the receiving module 160 receives the binding success information returned from the server.

With the client according to embodiments of the present disclosure, by obtaining the identifier of the intermediate device and the identifier of the controlled device and sending the binding request to the server, the server may bind the controlled device and the intermediate device to the current user account, such that the same user account may control and manage a plurality of controlled devices in a unified manner and consequently the problem of distance limitations in controlling the controlled device may be solved. Thus, the user may simply log into the client to control the controlled device anywhere, anytime, thereby providing the user with convenience and enhancing the experience of the user.

Figure 9:
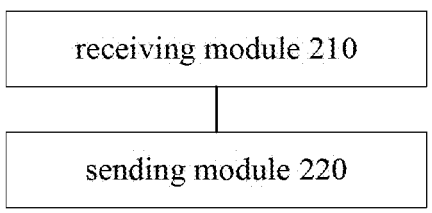
FIG. 9 is a block diagram of a server according to an embodiment of the present disclosure.

FIG. 9 is a block diagram of a server according to an embodiment of the present disclosure.

As shown in FIG. 9, the server according to an embodiment of the present disclosure comprises a receiving module 210 and a sending module 220.

The receiving module 210 is configured to receive from a client a resource downloading command carrying information on an intermediate device which is to obtain a source.

In some embodiments, the receiving module 210 may receive from the client the resource downloading command carrying the information on the intermediate device which is to obtain the source. The intermediate device may be a router. The information on the intermediate device may include an identifier of the intermediate device, etc.

The sending module 220 is configured to send a download instruction to the intermediate device according to the resource downloading command so as to enable the intermediate device to obtain the resource according to the download instruction.

In some embodiments, after receiving the resource downloading command from the client, the sending module 220 may determine whether a storage space of the intermediate device meets a requirement according to the resource downloading command; if yes, the sending module 220 generates a resource downloading address, and sends the download instruction containing the resource downloading address to the intermediate device, such that the corresponding intermediate device obtains the corresponding resource according to the download instruction.

With the server according to embodiments of the present disclosure, by receiving the resource downloading command from the client and sending the download instruction to the intermediate device, the corresponding intermediate device obtains the corresponding resource according to the download instruction, such that the problem of distance limitations in controlling the controlled device may be solved. Thus, the user may simply log into the client to control the controlled device anywhere, anytime, thereby providing the user with convenience and enhancing the experience of the user.

Figure 10:
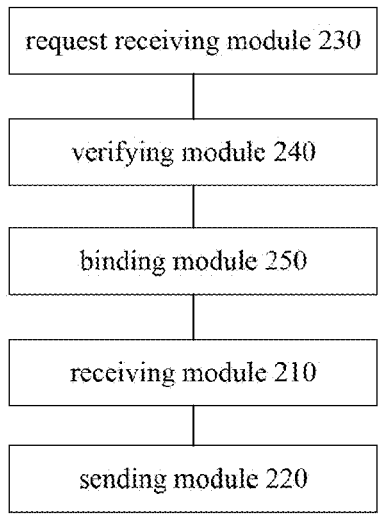
FIG. 10 is a block diagram of a server according to a particular embodiment of the present disclosure.

FIG. 10 is a block diagram of a server according to a particular embodiment of the present disclosure.

As shown in FIG. 9, the server according to an embodiment of the present disclosure comprises a receiving module 210, a sending module 220, a request receiving module 230, a verifying module 240 and a binding module 250.

The request receiving module 230 is configured to receive a binding request from a client, in which the binding request contains identifiers of the intermediate device and the controlled device to be bound to a current user account.

In some embodiments, after the client obtains the identifier of the intermediate device and the identifier of the controlled device, the request receiving module 230 receives from the client the binding request containing the identifiers of the intermediate device and the controlled device to be bound to the current user account.

The verifying module 240 is configured to send the binding request to a verification server, and to receive verification success information returned from the verification server.

In some embodiments, the verifying module 240 sends to the corresponding verification server the binding request containing the identifiers of the intermediate device and the controlled device to be bound to the current user account. For example, the verifying module 240 sends a binding request for a smart television to a verification server corresponding to the smart television, or the verifying module 240 sends a binding request for a router to a verification server corresponding to the router. Then, the verifying module 240 receives the verification success information returned from the verification server.

The binding module 250 is configured to bind the controlled device and the intermediate device to the current user account according to the verification success information, and to return binding success information to the client.

In some embodiments, after the verifying module 240 receives the verification success information returned from the verification server, the binding module 250 may call an application program interface (API) according to the verification success information to bind the controlled device and the intermediate device to the current user account. After the binding is successful, the binding success information is returned to the client from the binding module 250.

With the server according to embodiments of the present disclosure, by binding the controlled device and the intermediate device to the current user account, the same user account may control and manage a plurality of controlled devices in a unified manner, and consequently the problem of distance limitations in controlling the controlled device may be solved. Thus, the user may simply log into the client to control the controlled device anywhere, anytime, thereby providing the user with convenience and enhancing the experience of the user.

Figure 11:
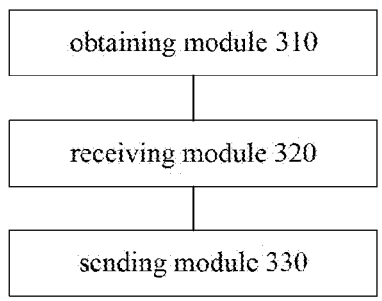
FIG. 11 is a block diagram of an intermediate device according to an embodiment of the present disclosure.

FIG. 11 is a block diagram of an intermediate device according to an embodiment of the present disclosure.

As shown in FIG. 11, the intermediate device according to an embodiment of the present disclosure comprises an obtaining module 310, a receiving module 320 and a sending module 330.

The obtaining module 310 is configured to receive a download instruction from a server, and to obtain a resource according to the download instruction.

In some embodiments, the obtaining module 310 may receive the download instruction from the server, and obtains a resource downloading address according to the download instruction, and then downloads the resource according to the resource downloading address. The intermediate device may be a router. Specifically, the obtaining module 310 may download the resource via a peer-to-peer network (P2P), and if the downloading of the resource via the peer-to-peer network fails, the intermediate device is connected with a source station to download the resource.

The receiving module 320 is configured to receive an operation instruction from the server.

The sending module 330 is configured to send the operation instruction to a controlled device associated with the intermediate device so as to enable the controlled device to obtain the resource to perform an operation according to the operation instruction.

In some embodiments, after the receiving module 320 receives the operation instruction from the client, the sending module 330 sends the operation instruction to the controlled device associated with the intermediate device, such that the controlled device obtains the corresponding resource to perform the related operation according to the operation instruction. For example, the resource stored in a router may be a movie, the user may log into the client via a mobile phone to send an operation instruction for a smart television to the server, the operation instruction is sent to the router, and then the smart television receives the operation instruction from the router and plays the movie stored in the router according to the operation instruction. In addition, the playing speed of the movie may be controlled, and the volume of the movie may be adjusted.

Specifically, in this embodiment, the intermediate device may be a router. The intermediate device not only may be used to connect various controlled devices, but also may have an independent operating system, such that the user may install various applications by himself/herself, and control the bandwidth, online population, web browsing and online time by himself/herself. Moreover, the intermediate device may have a certain storage space to store resources pushed by the server or resources the user downloads.

With the intermediate device according to embodiments of the present disclosure, since the intermediate device receives the download instruction from the server and sends the operation instruction to the controlled device associated with the intermediate device, the controlled device may obtain the corresponding resource to perform the related operation according to the operation instruction, such that the problem of distance limitations in controlling the controlled device may be solved. Thus, the user may simply log into the client to control the controlled device anywhere, anytime, thereby providing the user with convenience and enhancing the experience of the user.

Figure 12:
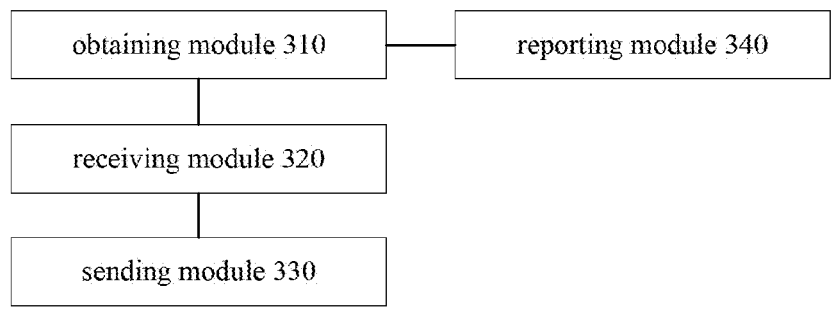
FIG. 12 is a block diagram of an intermediate device according to a particular embodiment of the present disclosure.

FIG. 12 is a block diagram of an intermediate device according to a particular embodiment of the present disclosure.

As shown in FIG. 12, the intermediate device according to a particular embodiment of the present disclosure comprises an obtaining module 310, a receiving module 320, a sending module 330 and a reporting module 340.

The obtaining module 310, the receiving module 320 and the sending module 330 in this embodiment perform substantially the same functions as those shown in FIG. 11 respectively, so detailed description thereof will be omitted herein.

The reporting module 340 is configured to report download progress and resource storage state information to the server regularly.

With the intermediate device according to embodiments of the present disclosure, by reporting the download progress and the resource storage state information to the server regularly, the user may know about the storage state of the intermediate device in time, and then clean up the storage space of the intermediate device according to the storage state of the intermediate device, such that the intermediate device may have an enough space to download the resource when receiving the download instruction from the server.

Figure 13:
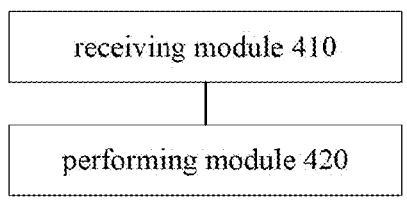
FIG. 13 is a block diagram of a controlled device according to an embodiment of the present disclosure.

FIG. 13 is a block diagram of a controlled device according to an embodiment of the present disclosure.

As shown in FIG. 13, the controlled device according to an embodiment of the present disclosure comprises a receiving module 410 and a performing module 420.

The receiving module 410 is configured to receive an operation instruction from an intermediate device, in which the operation instruction is an instruction sent to the intermediate device from a client via a server.

In some embodiments, the receiving module 410 receives from the intermediate device the operation instruction sent to the intermediate device from the client via the server. The intermediate device may be a router, etc. the controlled device may be a smart television, etc.

The performing module 420 is configured to obtain a resource from the intermediate device according to the operation instruction, and to perform a related operation according to the resource.

In some embodiments, the performing module 420 may obtain the resource from the intermediate device according to the operation instruction, and perform the related operation according to the resource. For example, the resource stored in a router may be a movie, the user may log into the client via a mobile phone to send an operation instruction for a smart television to the server, the operation instruction is sent to the router, and then the smart television receives the operation instruction from the router and plays the movie stored in the router according to the operation instruction. The smart television also has a certain storage space itself, such that the smart television may first download the resource in the router locally and then play the movie. In this way, the burden on the router may be reduced, thus improving the operation efficiency of the router. In addition, the related operation may also comprise controlling the playing speed of the movie, and adjusting the volume of the movie.

With the controlled device according to embodiments of the present disclosure, the intermediate device receives the operation instruction sent to the intermediate device from the client via the server and performs the related operation, such that the problem of distance limitations in controlling the controlled device may be solved. Thus, the user may simply log into the client to control the controlled device anywhere, anytime, thereby providing the user with convenience and enhancing the experience of the user.

Figure 14:
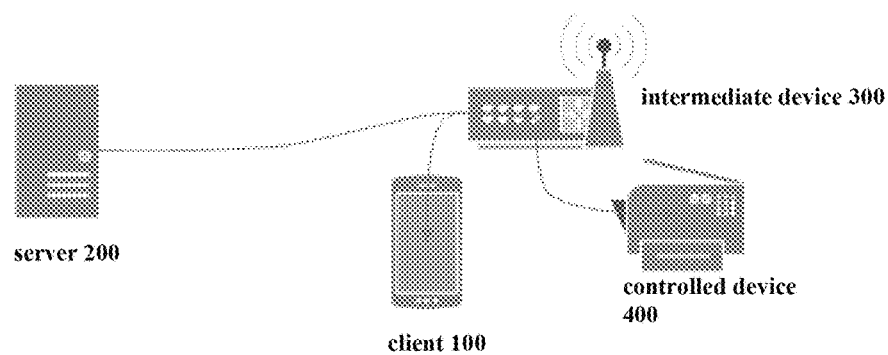
FIG. 14 is a schematic diagram of a device controlling system according to an embodiment of the present disclosure.

FIG. 14 is a schematic diagram of a device controlling system according to an embodiment of the present disclosure.

As shown in FIG. 14, the device controlling system according to an embodiment of the present disclosure comprises a client 100, a server 200, an intermediate device 300 and a controlled device 400. The client 100 may be a mobile phone, the intermediate device 300 may be a router, and the controlled device 400 may be a smart television or other fixed devices. The controlled device 400 is the one described with reference to FIGS. 1-6, and the client 100, the server 200, the intermediate device 300 and the controlled device 400 cooperate with each other to accomplish the control on the controlled device 400 as shown in FIGS. 1-6, so detailed description thereof will be omitted herein.

Figure 15:
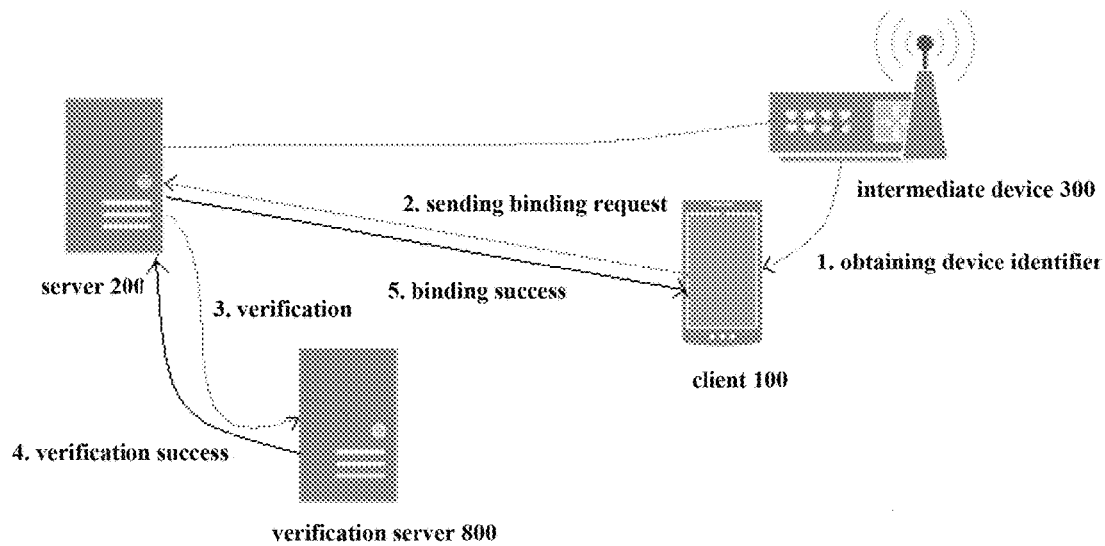
FIG. 15 is a schematic diagram of a device binding process according to an embodiment of the present disclosure.

Referring to FIG. 15, the client 100 finds the intermediate device 300 and the controlled device 400, and binds a user account to the intermediate device 300 and the controlled device 400, which may be realized with the methods as shown in FIGS. 1-6, so detailed description thereof will be omitted herein.

Figure 16:
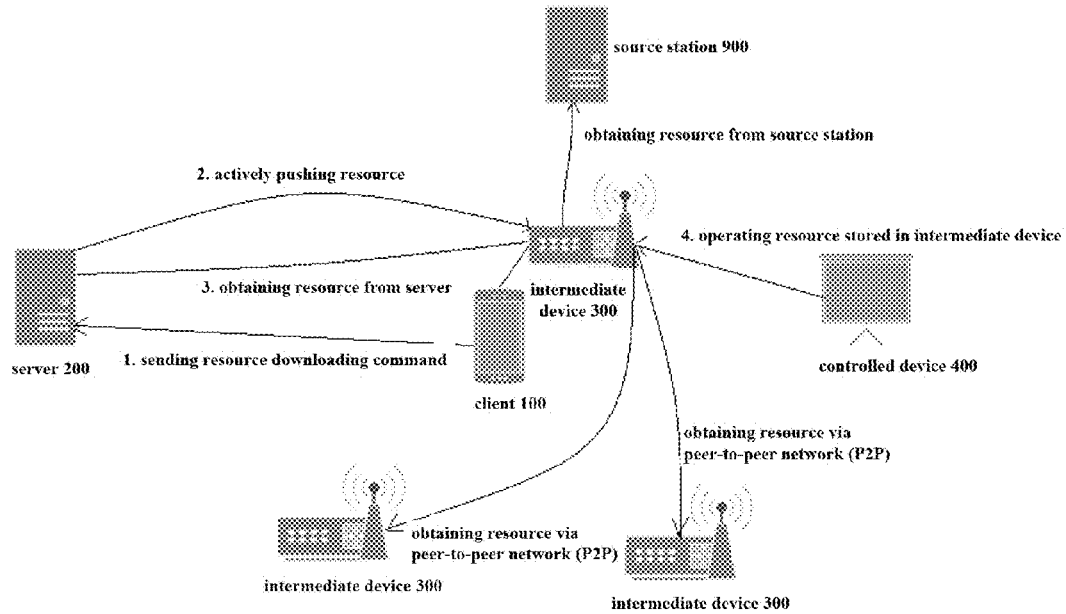
FIG. 16 is a schematic diagram of a process of controlling a controlled device according to an embodiment of the present disclosure.

Furthermore, referring to FIG. 16, the user employs the client 100, the server 200 and the intermediate device 300 to control the controlled device 400, which may be realized with the methods as shown in FIGS. 1-6, so detailed description thereof will be omitted herein.

Figure 17:
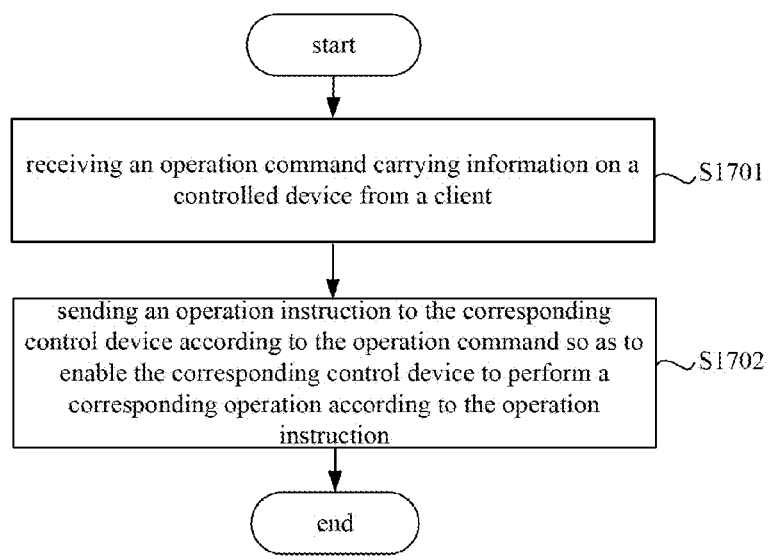
FIG. 17 is a flow chart of a device controlling method according to a seventh embodiment of the present disclosure.

FIG. 17 is a flow chart of a device controlling method according to a seventh embodiment of the present disclosure.

This embodiment will be described at a server side. As shown in FIG. 17, the device controlling method according to the seventh embodiment of the present disclosure comprises the following steps.

In step S1701, an operation command carrying information on a controlled device is received from a client.

The information on the controlled device may include a model, a storage space and an identifier of the controlled device, etc. The controlled device may be a smart television or a router.

In step S1702, an operation instruction is sent to the corresponding control device according to the operation command so as to enable the corresponding control device to perform a corresponding operation according to the operation instruction.

Take the description of a smart television as the controlled device for example. First, the client sends the operation command to the server, the server receives the operation command and then sends the operation instruction to the smart television, the smart television performs a corresponding operation and then returns an operation completion message to the server, and finally the server feeds back the operation completion message to the client. The operation may comprise starting the smart television and adjusting the volume of the smart television. When a resource (e.g., a movie) is to be played, the smart television may directly play the resource stored in the server, or may download the resource locally and then play the resource.

In some embodiments, the server may further receive from the client a resource downloading command carrying the information on the controlled device which is to obtain a resource, and determine whether a storage space of the corresponding controlled device meets a requirement according to the resource downloading command; if yes, the server generates a resource downloading address, and sends the download instruction containing the resource downloading address to the corresponding controlled device, such that the corresponding controlled device downloads the corresponding resource according to the download instruction.

Specifically, the server receives resource storage state information reported by the corresponding controlled device, and determines whether the storage space of the corresponding controlled device is greater than or equal to a size of the resource to be downloaded according to the resource downloading command and the resource storage state information. If the storage space of the corresponding controlled device is greater than or equal to the size of the resource to be downloaded, the server generates a resource downloading address, and sends the download instruction containing the resource downloading address to the corresponding controlled device, such that the corresponding controlled device obtains the corresponding resource according to the download instruction. After the controlled device obtains the corresponding resource, the server calls an application program interface (API) to inform the client of downloading completion. If the storage space of the controlled device is smaller than the size of the resource to be downloaded, resources actively pushed by the server to the controlled device are preferentially removed. If the storage space of the controlled device is still smaller than the size of the resource to be downloaded, a prompt for insufficient storage space is sent to the client so as to enable the client to remove the resource selected by the user according to the operation of the user, such that the storage space of the controlled device is greater than or equal to the size of the resource to be downloaded.

Before receiving the operation command from the client, the server may also receive a device binding request from the client, in which the device binding request contains the information on the controlled device to be bound to a current user account. Then, the server sends the device binding request to a verification server, and receives verification success information returned from the verification server. Finally, the server binds the controlled device to the current user account according to the verification success information, and returns binding success information to the client.

In some embodiments, after receiving the verification success information returned from the verification server, the server may call the application program interface (API) according to the verification success information to bind the corresponding controlled device to the current user account. After the binding is successful, the binding success information is returned to the client from the server.

With the device controlling method according to embodiments of the present disclosure, by binding the controlled device to the current user account, the same user account may control and manage a plurality of controlled devices in a unified manner, and consequently the problem of distance limitations in controlling the controlled device may be solved. Thus, the user may simply log into the client to control the controlled device anywhere, anytime, thereby providing the user with convenience and enhancing the experience of the user.

Figure 18:
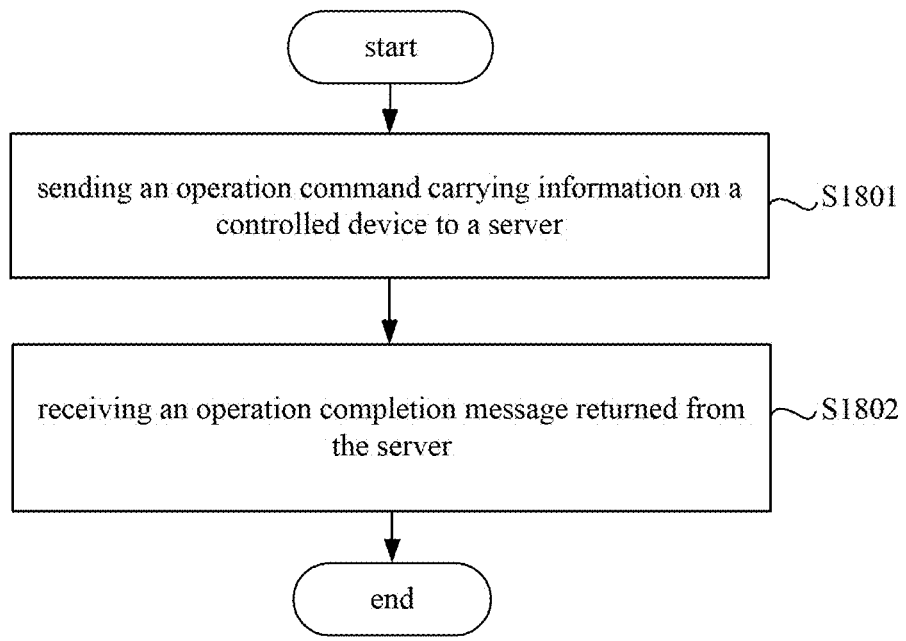
FIG. 18 is a flow chart of a device controlling method according to an eighth embodiment of the present disclosure.

FIG. 18 is a flow chart of a device controlling method according to an eighth embodiment of the present disclosure.

This embodiment will be described at a client side. As shown in FIG. 18, the device controlling method according to the eighth embodiment of the present disclosure comprises the following steps.

In step S1801, an operation command carrying information on a controlled device is sent to a server.

The information on the controlled device may include a model, a storage space and an identifier of the controlled device, etc. Specifically, a client may obtain the identifier of the controlled device by a digital living network alliance (DLNA), or by inputting a serial number of the controlled device, or by scanning a two-dimensional code of the controlled device.

In step S1802, an operation completion message returned from the server is received.

Take the description of a smart television as the controlled device for example. First, the client sends the operation command to the server, the server receives the operation command and then sends the operation instruction to the smart television, the smart television performs a corresponding operation and then returns an operation completion message to the server, and finally the server feeds back the operation completion message to the client. The operation may comprise starting the smart television and adjusting the volume of the smart television. When a resource (e.g., a movie) is to be played, the smart television may directly play the resource stored in the server, or may download the resource locally and then play the resource.

In some embodiments, the client may further send to the server the a resource downloading command carrying the information on the controlled device which is to obtain a resource, and after the downloading of the resource by the controlled device is completed, the client may receive a resource downloading completion message returned from the server.

Before sending the operation command to the server, the client may also send to the server an authentication request containing information on a current user account.

After receiving authentication success information returned from the server, the client may obtain the identifier of the controlled device, and then sends to the server a device binding request containing the identifier of the controlled device to be bound to the current user account.

Finally, after the binding is successful, the client receives binding success information returned from the server.

With the device controlling method according to embodiments of the present disclosure, by obtaining the identifier of the controlled device and sending the device binding request to the server so as to bind the controlled device to the current user account, the same user account may control and manage a plurality of controlled devices in a unified manner, and consequently the problem of distance limitations in controlling the controlled device may be solved. Thus, the user may simply log into the client to control the controlled device anywhere, anytime, thereby providing the user with convenience and enhancing the experience of the user.

Figure 19:
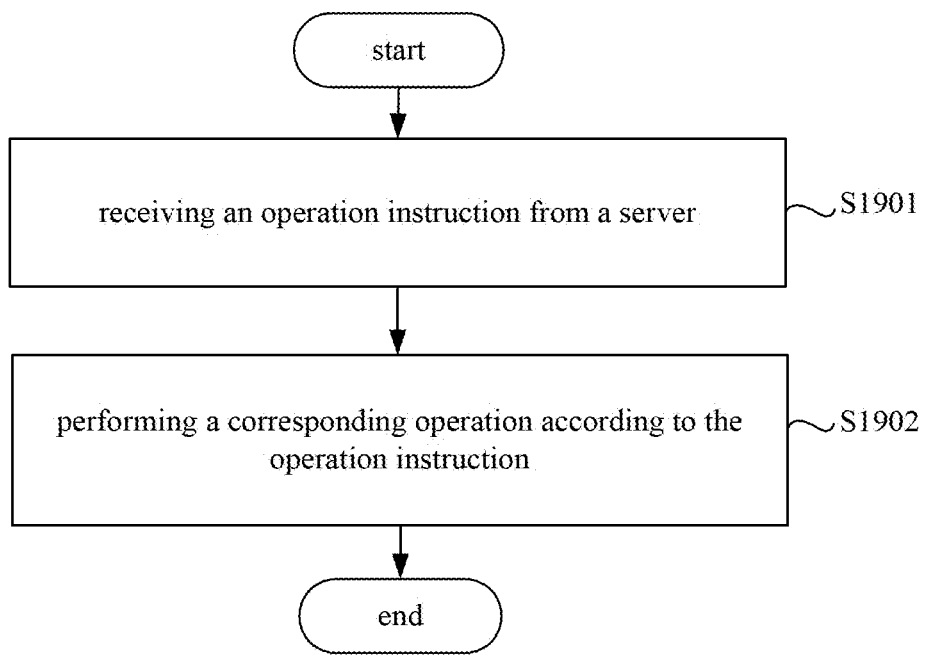
FIG. 19 is a flow chart of a device controlling method according to a ninth embodiment of the present disclosure.

FIG. 19 is a flow chart of a device controlling method according to a ninth embodiment of the present disclosure.

This embodiment will be described at a controlled device. As shown in FIG. 19, the device controlling method according to the ninth embodiment of the present disclosure comprises the following steps.

In step S1901, an operation instruction is received from a server.

A controlled device may receive the operation instruction from the server. The controlled device may be a smart television or a router.

In step S1902, a corresponding operation is performed according to the operation instruction.

Take the description of a smart television as the controlled device for example. First, the client sends an operation command to the server, the server receives the operation command and then sends the operation instruction to the smart television, the smart television performs a corresponding operation and then returns an operation completion message to the server, and finally the server feeds back the operation completion message to the client. The operation may comprise starting the smart television and adjusting the volume of the smart television. When a resource (e.g., a movie) is to be played, the smart television may directly play the resource stored in the server, or may download the resource locally and then play the resource.

In some embodiments, the controlled device may further receive a download instruction from the server, and obtains a resource downloading address according to the download instruction, and then downloads a resource according to the resource downloading address.

Specifically, the controlled device may download the resource via a peer-to-peer network (P2P), and if the downloading of the resource via the peer-to-peer network fails, the controlled device is connected with a source station to download the resource.

In downloading the resource, if it is detected that a storage space of the controlled device is insufficient, the controlled device may prompt for a downloading failure and display the reason for the downloading failure.

Furthermore, when downloading the resource according to the resource downloading address, the controlled device may further report download progress and resource storage state information to the server regularly.

With the device controlling method according to embodiments of the present disclosure, by receiving the operation instruction from the server and performing the corresponding operation according to the operation instruction, the problem of distance limitations in controlling the controlled device may be solved. Thus, the user may simply log into the client to control the controlled device anywhere, anytime, thereby providing the user with convenience and enhancing the experience of the user.

Figure 20:
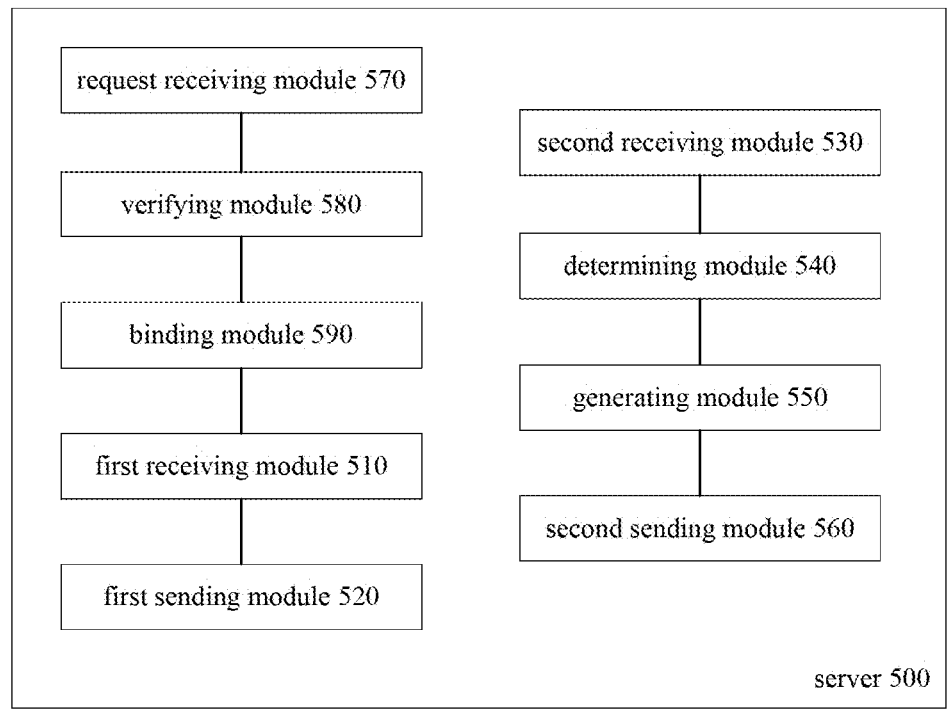
FIG. 20 is a block diagram of a server according to another embodiment of the present disclosure.

FIG. 20 is a block diagram of a server according to another embodiment of the present disclosure.

As shown in FIG. 20, the server 500 according to another embodiment of the present disclosure comprises a first receiving module 510 and a first sending module 520.

The first receiving module 510 is configured to receive from a client an operation command carrying information on a controlled device.

The information on the controlled device may include a model, a storage space and an identifier of the controlled device, etc. The controlled device may be a smart television or a router.

The first sending module 520 is configured to send an operation instruction to the corresponding control device according to the operation command so as to enable the corresponding control device to perform a corresponding operation according to the operation instruction.

In some embodiments, the server 500 further comprises a second receiving module 530, a determining module 540, a generating module 550 and a second sending module 560.

The second receiving module 530 is configured to receive from the client a resource downloading command carrying the information on the controlled device which is to obtain a resource.

The determining module 540 is configured to determine whether a storage space of the corresponding controlled device meets a requirement according to the resource downloading command. Specifically, the determining module 540 receives resource storage state information reported by the corresponding controlled device, and determines whether the storage space of the corresponding controlled device is greater than or equal to a size of the resource to be downloaded according to the resource downloading command and the resource storage state information.

The generating module 550 is configured to generate a resource downloading address if the storage space of the corresponding controlled device meets the requirement.

The second sending module 560 is configured to send the download instruction containing the resource downloading address to the corresponding controlled device, such that the corresponding controlled device downloads the corresponding resource according to the download instruction.

In some embodiments, the server further comprises a request receiving module 570, a verifying module 580 and a binding module 590.

The request receiving module 570 is configured to receive a device binding request from the client before receiving the operation command from the client, in which the device binding request contains the information on the controlled device to be bound to a current user account.

The verifying module 580 is configured to send the device binding request to a verification server, and to receive verification success information returned from the verification server.

The binding module 590 is configured to bind the controlled device to the current user account according to the verification success information, and to return binding success information to the client.

Specifically, the binding module 590 may call an application program interface (API) according to the verification success information to bind the corresponding controlled device to the current user account. After the binding is successful, the binding success information is returned to the client by the binding module 590.

With the server according to embodiments of the present disclosure, by binding the controlled device to the current user account, the same user account may control and manage a plurality of controlled devices in a unified manner, and consequently the problem of distance limitations in controlling the controlled device may be solved. Thus, the user may simply log into the client to control the controlled device anywhere, anytime, thereby providing the user with convenience and enhancing the experience of the user.

Figure 21:
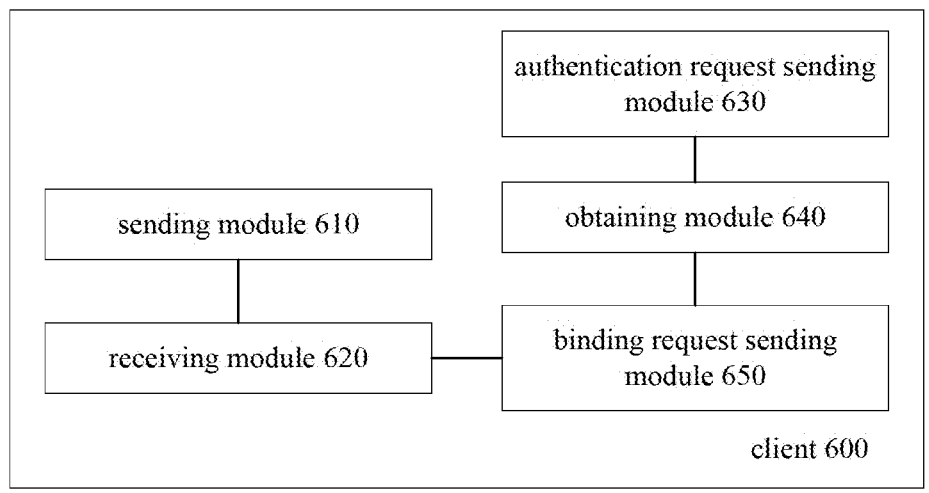
FIG. 21 is a block diagram of a client according to another embodiment of the present disclosure.

FIG. 21 is a block diagram of a client according to another embodiment of the present disclosure.

As shown in FIG. 21, the client 600 according to another embodiment of the present disclosure comprises a sending module 610 and a receiving module 620.

The sending module 610 is configured to send an operation command carrying information on a controlled device to a server.

The information on the controlled device may include a model, a storage space and an identifier of the controlled device, etc. Specifically, the client 600 may obtain the identifier of the controlled device by a digital living network alliance (DLNA), or by inputting a serial number of the controlled device, or by scanning a two-dimensional code of the controlled device.

The receiving module 620 is configured to receive an operation completion message returned from the server.

In some embodiments, the sending module 610 may be further configured to send to the server a resource downloading command carrying the information on the controlled device which is to obtain a resource. The receiving module 620 is further configured to receive a resource downloading completion message returned from the server after the downloading of the resource by the controlled device is completed.

In some embodiments, the server 600 further comprises an authentication request sending module 630, an obtaining module 640 and a binding request sending module 650.

The authentication request sending module 630 is configured to send to the server an authentication request containing information on a current user account before the sending module 610 sends the operation command to the server.

The obtaining module 640 is configured to obtain the identifier of the controlled device after receiving authentication success information returned from the server.

The binding request sending module 650 is configured to send to the server a device binding request containing the identifier of the controlled device to be bound to the current user account.

Furthermore, after the binding is successful, the receiving module 620 is further configured to receive binding success information returned from the server.

With the client according to embodiments of the present disclosure, by obtaining the identifier of the controlled device and sending the device binding request to the server so as to bind the controlled device to the current user account, the same user account may control and manage a plurality of controlled devices in a unified manner, and consequently the problem of distance limitations in controlling the controlled device may be solved. Thus, the user may simply log into the client to control the controlled device anywhere, anytime, thereby providing the user with convenience and enhancing the experience of the user.

Figure 22:
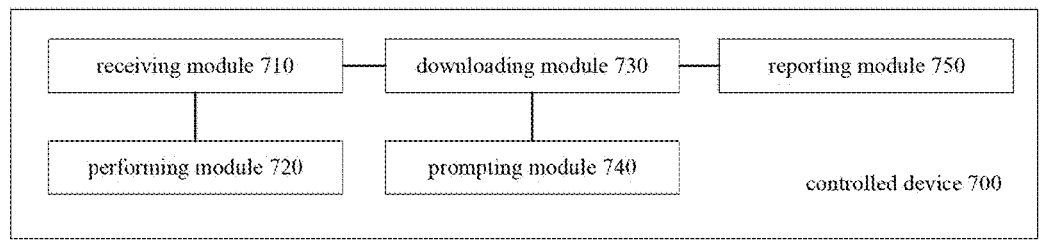
FIG. 22 is a block diagram of a controlled device according to another embodiment of the present disclosure.

FIG. 22 is a block diagram of a controlled device according to another embodiment of the present disclosure.

As shown in FIG. 22, the controlled device 700 according to another embodiment of the present disclosure comprises a receiving module 710 and a performing module 720.

The receiving module 710 is configured to receive an operation instruction from a server.

In some embodiments, the receiving module 710 is further configured to receive a download instruction from the server.

The performing module 720 is configured to perform a corresponding operation according to the operation instruction.

In some embodiments, the controlled device 700 further comprises a downloading module 730, a prompting module 740 and a reporting module 750.

The downloading module 730 is configured to obtain a resource downloading address according to the download instruction, and to download a resource according to the resource downloading address.

Specifically, the downloading module 730 may download the resource via a peer-to-peer network (P2P), and if the downloading of the resource via the peer-to-peer network fails, the controlled device is connected with a source station to download the resource.

The prompting module 740 is configured to prompt for a downloading failure and display the reason for the downloading failure if it is detected that a storage space of the controlled device is insufficient in downloading the resource.

The reporting module 750 is configured to report download progress and resource storage state information to the server regularly when the downloading module 730 downloads the resource according to the resource downloading address.

With the controlled device according to embodiments of the present disclosure, by receiving the operation instruction from the server and performing the corresponding operation according to the operation instruction, the problem of distance limitations in controlling the controlled device may be solved. Thus, the user may simply log into the client to control the controlled device anywhere, anytime, thereby providing the user with convenience and enhancing the experience of the user.

Figure 23:
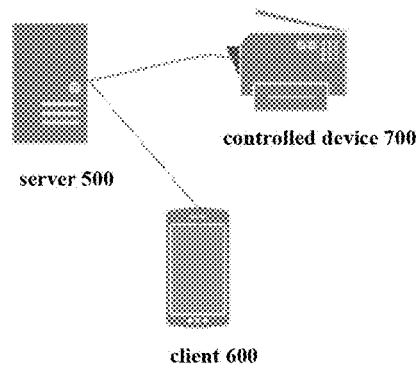
FIG. 23 is a schematic diagram of a device controlling system according to another embodiment of the present disclosure.

FIG. 23 is a schematic diagram of a device controlling system according to another embodiment of the present disclosure.

As shown in FIG. 23, the device controlling system comprises a server 500, a client 600 and a controlled device 700. The client 600 may be a mobile phone, and the controlled device 700 may be a smart television, a router, etc. The server 500, the client 600, and the controlled device 700 cooperate with each other to accomplish the control on the controlled device 700 as shown in FIGS. 17-19, so detailed description thereof will be omitted herein.

Figure 24:
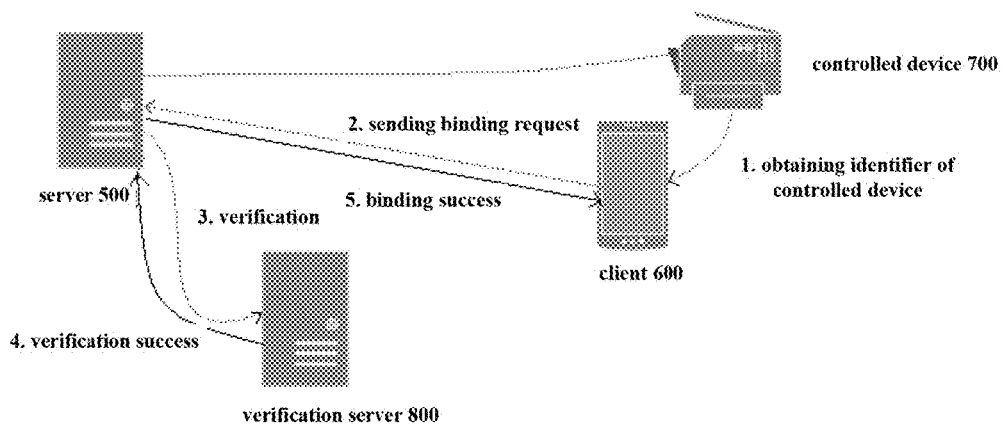
FIG. 24 is a schematic diagram of a device binding process according to another embodiment of the present disclosure.

Referring to FIG. 24, the client 600 finds the controlled device 700, and binds a user account to the controlled device 700, which may be realized with the methods as shown in FIGS. 17-19, so detailed description thereof will be omitted herein.

Figure 25:
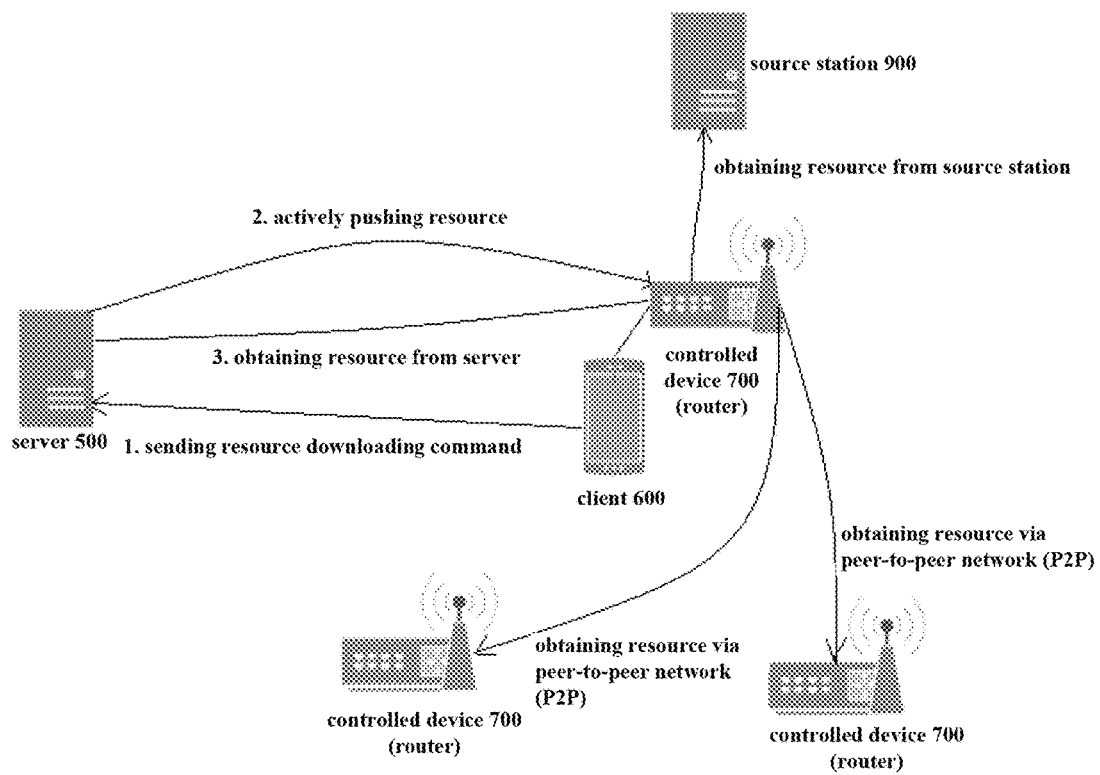
FIG. 25 is a schematic diagram of a process of controlling a controlled device according to another embodiment of the present disclosure.

Furthermore, referring to FIG. 25, take the description of a router as the controlled device 700 for example. The user employs the server 500 and the client 600 to control the controlled device 700, which may be realized with the methods as shown in FIGS. 17-19, so detailed description thereof will be omitted herein.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A device controlling method, comprising:
   acquiring, by a client device, information on a router and information on a controlled device associated with the router, the information on the router including an identifier of the router and the information on the controlled device including an identifier of the controlled device, the router and the controlled device being connected over a local area network;
   sending, by the client device, a binding request to a server, wherein the binding request contains the identifiers of the router and the controlled device to be bound to a current user account;
   controlling operation of the controlled device from outside the local area network by:
   sending, by the client device over a communication network, a resource downloading command to the server, the resource downloading command carrying the information on the router so as to enable the router to obtain a resource and store the resource in a non-transitory computer-readable medium; and
   sending, by the client device, an operation instruction to the controlled device associated with the router, via the server and the router using the identifier of the controlled device, the operational instruction being configured to enable the controlled device to obtain the stored resource from the router and instruct the controlled device to perform an operation according to the operation instruction without requiring the client device to be within a predefined distance of the controlled device or connected to the local area network.

2. The method according to claim 1, wherein acquiring, by the client device, the information on the router and the information on the controlled device associated with the router comprises:

acquiring, by the client device, the current user account; and acquiring, by the client device, the information on the router and the controlled device bound to the current user account.

3. The method according to claim 2, wherein acquiring, by the client device, the information on the router and the information on the controlled device associated with the router further comprises:

receiving, by the client device, binding success information returned from the server.

4. The method according to claim 3, wherein obtaining, by the client device, the identifier of the router and the identifier of the controlled device comprises:

obtaining, by the client device, the identifier of the router and the identifier of the controlled device by a means of digital living network alliance;

obtaining, by the client device, the identifier of the router and the identifier of the controlled device by inputting serial numbers of the router and the controlled device; or obtaining, by the client device, the identifier of the router and the identifier of the controlled device by scanning two-dimensional codes of the router and the controlled device respectively.

5. A device controlling method, comprising:

receiving, by a server, from a client device, a resource downloading command carrying information on a router, which is to obtain a resource, the information including an identifier of the router, the resource downloading command being received over a communication network outside of a local network through which the router is connected to a controlled device;

receiving, by the server, a binding request from the client device, wherein the binding request contains the identifiers of the router and the controlled device to be bound to a current user account;

receiving, by the server, storage space information from the router;

sending, by the server, a download instruction to the router according to the resource downloading command so as to instruct the router to obtain the resource according to the download instruction, wherein sending the download instruction comprises:

determining, by the server, whether a storage space of the router meets a requirement;

if yes, generating a resource downloading address, by the server; and sending the download instruction containing the resource downloading address, by the server, to the router so as to enable the router to obtain the resource and store the resource in a non-transitory computer-readable medium;

receiving an operation instruction, by the server, from the client device over the communication network; and controlling operation of the controlled device by sending the received operation instruction, by the server, to the controlled device via the router using the identifier of the controlled device, the operation instruction being configured to enable the controlled device to obtain the stored resource from the router and instruct the controlled device to perform an operation according to the operation instruction without requiring the client device to be within a predefined distance of the controlled device or connected to the local area network.

6. The method according to claim 5, wherein determining, by the server, whether the storage space of the router meets a requirement comprises:

receiving, by the server, resource storage state information reported by the router; and determining, by the server, whether the storage space of the router is greater than or equal to a size of the resource to be downloaded.

7. The method according to claim 5, further comprising:

sending the binding request to a verification server, by the server;

receiving verification success information returned from the verification server, by the server;

binding the controlled device and the router to the current user account, by the server, according to the verification success information; and returning binding success information to the client device, by the server.

8. The method according to claim 7, wherein binding the controlled device and the router to the current user account, by the server, according to the verification success information comprises:

calling an application program interface, by the server, according to the verification success information to bind the controlled device and the router to the current user account.

9. A device controlling method performed by a router, comprising:

sending storage space information to a server over a communication network;

receiving a download instruction from the server over the communication network when the server determines a storage space of the router meets a requirement, the download instruction being associated to a resource to be obtained by a controlled device to which the router is connected over a local area network, the router and the controlled device being bound to a user account by a binding request sent by a client device to the server and including identifiers of the router and the controlled device;

obtaining the resource, by the router, according to the download instruction and storing the resource in a non-transitory computer-readable medium;

controlling operation of the controlled device by:

receiving an operation instruction from the server, which was sent to the server by the client device over the communication network, outside the local area network, using the identifier of the controlled device; and sending the operation instruction to the controlled device over the local area network, the operation instruction being configured to enable the controlled device to obtain the resource from the router and instruct the controlled device to perform an operation according to the operation instruction without requiring the client device to be within a predefined distance of the controlled device or connected to the local area network.

10. The method according to claim 9, wherein obtaining the resource, by the router, according to the download instruction comprises:

obtaining a resource downloading address, by the router, according to the download instruction; and downloading the resource, by the router, according to the resource downloading address.

11. The method according to claim 10, wherein downloading the resource, by the router, according to the resource downloading address comprises:

downloading the resource, by the router, via a peer-to-peer network; and if the downloading of the resource via the peer-to-peer network fails, connecting with a source station, by the router, to download the resource.

12. The method according to claim 10, further comprising:

reporting download progress and resource storage state information, by the router, to the server regularly.

13. A client device, comprising:

one or more processors; and a computer readable medium comprising instructions executable by one or more processors to configure the one or more processors to:

acquire information on a router and information on a controlled device associated with the router, the information on the router including an identifier of the router and the information on the controlled device including an identifier of the controlled device, the router and the controlled device being connected over a local area network;

send, by the client device, a binding request to a server, wherein the binding request contains the identifiers of the router and the controlled device to be bound to a current user account;

control operation of the controlled device from outside the local area network by:

sending, by the client device over a communication network, a resource downloading command to the server, the resource downloading command carrying the information on the router so as to enable the router to obtain a resource via the server and store the resource in a non-transitory computer-readable medium; and sending, by the client device, an operation instruction to the controlled device associated with the router, via the server and the router using the identifier of the controlled device, the operational instruction being configured to enable the controlled device to obtain the stored resource from the router and instruct the controlled device to perform an operation according to the operation instruction without requiring the client device to be within a predefined distance of the controlled device or connected to the local area network.

14. The client device according to claim 13, wherein the computer readable medium comprises instructions executable by the one or more processors to configure the one or more processors to:

acquire the current user account; and acquire the information on the router and the controlled device bound to the current user account.

15. The client device according to claim 14, wherein the computer readable medium comprises instructions executable by the one or more processors to configure the one or more processors to:

receive binding success information returned from the server.

16. The client device according to claim 15, wherein the computer readable medium comprises instructions executable by the one or more processors to configure the one or more processors to:

obtain the identifier of the router and the identifier of the controlled device by a digital living network alliance;

obtain the identifier of the router and the identifier of the controlled device by inputting serial numbers of the router and the controlled device; or obtain the identifier of the router and the identifier of the controlled device by scanning two-dimensional codes of the router and the controlled device respectively.

17. A server, comprising:

one or more processors; and a computer readable medium comprising instructions executable by the one or more processors to configure the one or more processors to:

receive from a client device a resource downloading command carrying information on a router which is to obtain a source, the information including an identifier of the router, the one or more processors being configured to receive the resource downloading command over a communication network outside of a local network through which the router is connected to a controlled device;

receiving, by the server, a binding request from the client device, wherein the binding request contains the identifiers of the router and the controlled device to be bound to a current user account;

receive storage space information from the router;

send a download instruction to the router according to the resource downloading command so as to instruct the router to obtain the resource according to the download instruction, comprising:

determining whether a storage space of the router meets a requirement;

if yes, generating a resource downloading address; and sending the download instruction containing the resource downloading address to the router so as to enable the router to obtain the resource and store the resource in a non-transitory computer-readable medium;

receive an operation instruction, by the server, from the client device over the communication network; and control operation of the controlled device by sending the received operation instruction, by the server, to the controlled device via the router using the identifier of the controlled device, the operation instruction being configured to enable the controlled device to obtain the stored resource from the router and instruct the controlled device to perform an operation according to the operation instruction without requiring the client device to be within a predefined distance of the controlled device or connected to the local area network.

18. The server according to claim 17, wherein the computer readable medium comprises instructions executable by the one or more processors to configure the one or more processors to:

send the binding request to a verification server;

receive verification success information returned from the verification server;

bind the controlled device and the router to the current user account according to the verification success information; and return binding success information to the client device.

19. The server according to claim 18, wherein the computer readable medium comprises instructions executable by the one or more processors to configure the one or more processors to call an application program interface according to the verification success information to bind the controlled device and the router to the current user account.

20. A router, comprising:
one or more processors; and
a computer readable medium comprising instructions executable by the one or more processors to configure the one or more processors to:
send storage space information to a server over a communication network;
receive a download instruction from the server over a communication network when the server determines a storage space of the router meets a requirement, the download instruction being associated to a resource to be obtained by a controlled device to which the router is connected over a local area network, the router and the controlled device being bound to a user account by a binding request sent by a client device to the server and including identifiers of the router and the controlled device;
obtain the resource according to the download instruction and store the resource in a non-transitory computer-readable medium;
control operation of the controlled device by:
receiving an operation instruction from the server, which was sent to the server by the client device over the communication network, outside the local area network, using the identifier of the controlled device; and
sending the operation instruction to the controlled device over the local area network, the operation instruction being configured to enable the controlled device to obtain the resource from the router and instruct the controlled device to perform an operation according to the operation instruction without requiring the client device to be within a predefined distance of the controlled device or connected to the local area network.

21. The router according to claim 20, wherein the computer readable medium comprises instructions executable by the one or more processors to configure the one or more processors to:
obtain a resource downloading address according to the download instruction; and
downloads the resource according to the resource downloading address.

22. The router according to claim 21, wherein the computer readable medium comprises instructions executable by the one or more processors to configure the one or more processors to:
download the resource via a peer-to-peer network; and
if the downloading of the resource via the peer-to-peer network fails, connect with a source station to download the resource.

23. The router according to claim 21, wherein the computer readable medium comprises instructions executable by the one or more processors to configure the one or more processors to report download progress and resource storage state information to the server regularly.

* * * * *